US006409376B1

(12) United States Patent
Knight

(10) Patent No.: US 6,409,376 B1
(45) Date of Patent: Jun. 25, 2002

(54) MIXER APPARATUS

(76) Inventor: William Knight, Tonnline Rd., Broadhead, WI (US) 53520

(*) Notice: Subject to any disclaimer, the term of this patent is extended or adjusted under 35 U.S.C. 154(b) by 0 days.

(21) Appl. No.: 09/562,167

(22) Filed: May 2, 2000

(51) Int. Cl.[7] ............................... B01F 7/24; B01F 7/20
(52) U.S. Cl. ..................... 366/141; 366/297; 366/300; 366/314; 366/318; 366/322; 366/603; 241/101.761
(58) Field of Search .................... 366/314, 297, 366/300, 266, 318, 322, 141, 603; 241/101.76, 101.761, 101.8

(56) References Cited

U.S. PATENT DOCUMENTS

| 384,719 A | * | 6/1888 | Safely |
| 2,551,709 A | * | 5/1951 | Skinner |
| 3,421,740 A | * | 1/1969 | Behrens |
| 3,517,567 A | * | 6/1970 | Willmann |
| 3,797,807 A | * | 3/1974 | Behrens |
| 5,429,436 A | * | 7/1995 | Stone |
| 5,823,667 A | * | 10/1998 | Fukushima et al. |

OTHER PUBLICATIONS

BLV "V–Mix/T/L/LS" V–Mix 10LS Date? 3 Pgs.
Siloking "Futter–Mischwagen" Mayer, Date? 3 Pgs.
"Supreme Feed Processors" Powerful–Thorough–Accurate Feb. 1999, 12 Pgs.
"Taylor"® Cutter Mixer Feeder Models 1300.1350.1500.1600, Date ?5 Pgs.
Schuler–TNR Total Mixed Ration to Complete Diet Mixers Nov. 1998, 4 Pgs.
NDE "Cutter–Mixer–Feeder" New Direction Equipment Co Date ? 4 Pgs.
"Tornado" Harsh® Vertical Auger Mixers Date? 6 Pgs.
Roto–Mix® Vertical Feed Mixers Date? 2 Pgs.
Shelbourne Reynolds Eng Ltd 45/23,60/30,80/40,100/50 Date? 6 Pgs.
"Trioliet" Solomix Date? 5 Pgs.
"Rheinland" OMIX Vertikal Hülsken Date? 4 Pgs.
"Peecon Biga" Peeters Landbounmachines BV. Date ? 6 Pgs.

* cited by examiner

Primary Examiner—Charles E. Cooley
Assistant Examiner—David Sorkin
(74) Attorney, Agent, or Firm—David J. Archer

(57) ABSTRACT

A mixer apparatus is disclosed for mixing livestock feed and the like. The apparatus includes a container for the reception therein of the feed. The container includes a housing and a wall extending away from the housing. The wall defines an opening which is disposed remote from the housing for the reception therethrough of the feed. The arrangement is such that the housing and the wall define therebetween an enclosure for the feed received through the opening. An auger is disposed within the enclosure, the auger having an axis of rotation which extends through the housing. A final driven wheel is disposed within the housing, the final driven wheel being rotatable about the axis of rotation. The final driven wheel is drivingly connected to the auger so that when the final driven wheel is rotated within the housing, the auger is rotated therewith within the enclosure. The final driven wheel and the auger together as a unit are removable and replaceable relative to the housing and enclosure respectively. The arrangement is such that when the final driven wheel and the auger are together as the unit removed, direct access to the final driven wheel is permitted.

41 Claims, 12 Drawing Sheets

MIXER APPARATUS

BACKGROUND OF THE INVENTION

1. Field of the Invention

The present invention relates to a mixer apparatus for mixing livestock feed. More specifically, the present invention relates to a vertical auger mixer having at least one auger.

2. Information Disclosure Statement

Cattle farming requires the mixing of various livestock feeds for subsequent distribution. Additionally, mixers can be used for mixing other materials such as composts and the like. Sometimes such mixing of feeds includes depositing at least one bale of hay into a mixer container together with other additives. The materials within the container are mixed by means of at least one auger which rotates within the container so that an intimate mixing of the contents of the container is obtained. Although many mixers employ a pair of horizontal interacting augers extending longitudinally along the container, several mixers have been proposed in which the auger or augers are disposed vertically.

In the prior art mixers of the vertical auger type, such mixers sometimes include a pair of augers in which the rotational axes of the augers are disposed spaced and parallel relative to each other. Furthermore, each of such augers is driven by a separate drive which supplies rotary motion to each of the augers from below.

Also, some mixers have a single auger. However, the aforementioned twin auger mixers suffer from the following drawbacks. First, the provision of two 90 degree drives and associated planetary reduction gearboxes is extremely expensive and involves the manufacture of many parts. Second, access to such gearboxes requires removal of the gearboxes from underneath the mixer and then disassembly of such gearboxes. Third, the augers include continuous flighting which provides less agitation of the feed. Fourth, at the end of a mixing operation, an operator will usually find it necessary to rev up the power take off in an attempt to throw materials centrifugally away from the augers so that the augers are cleaned. Fifth, when weighing materials to be mixed, inaccurate measurements are made when the mixer is on uneven ground. Such inaccuracies are caused mainly because when a load cell is disposed at the hitch of a drawbar, the reading reflects a vector rather than a vertical weight when the mixer is tilted. Most of the aforementioned drawbacks are also applicable to single auger mixers and the cost of providing a planetary gearbox and other parts is considerable.

The present invention provides a vertical auger mixer apparatus which overcomes all of the aforementioned problems associated with the prior art arrangements.

Therefore, it is a primary feature of the present invention to provide a mixer apparatus which overcomes the aforementioned problems associated with the prior art vertical auger mixers and which provides a significant contribution to the art of mixing animal feeds and the like.

Another feature of the present invention is the provision of a mixer apparatus that reduces the cost of manufacture thereof.

A further feature of the present invention is the provision of a mixer apparatus that permits vertical removal of the auger or augers together with the associated driven gear.

Another feature of the present invention is the provision of a mixer apparatus that enhances the mixing of the livestock feed.

Yet another feature of the present invention is the provision of a mixer apparatus that assists in the cleaning of the augers after a mixing operation.

Another feature of the present invention is the provision of a mixer apparatus which includes a more accurate means for weighing the livestock feed.

Throughout the description of the various embodiments of the present invention, the term auger or augers is to be understood to include paddle arrangements and that the flighting includes screw and/or helix type arrangements which may be continuous or non-continuous and would include segmented augers. Also, throughout the description and claims of the present invention, the term animal feeds is to be understood as including composts and other materials that require mixing.

Other features and advantages of the mixer apparatus according to the present invention will be readily apparent to those skilled in the art by a consideration of the detailed description contained herein of a preferred embodiment of the present invention.

SUMMARY OF THE DISCLOSURE

The present invention relates to a mixer apparatus for mixing livestock feed and the like. According to one feature of the present invention, the apparatus includes a container for the reception therein of the feed. The container includes a housing and a wall extending away from the housing. The wall defines an opening which is disposed remote from the housing for the reception therethrough of the feed. The arrangement is such that the housing and the wall define therebetween an enclosure for the feed received through the opening. An auger is disposed within the enclosure, the auger having an axis of rotation which extends through the housing. A final driven wheel is disposed within the housing, the final driven wheel being rotatable about the axis of rotation. The final driven wheel is drivingly connected to the auger so that when the final driven wheel is rotated within the housing, the auger is rotated therewith within the enclosure. The final driven wheel and the auger together as a unit are removable and replaceable relative to the housing and enclosure respectively. The arrangement is such that when the final driven wheel and the auger are together as the unit removed, direct access to the final driven wheel is permitted.

In a more specific embodiment of the present invention the container further includes a frame for supporting thereon the housing. The container also includes a plurality of wheels rotatably secured to the frame for permitting transportation of the mixer apparatus. Additionally, the container includes a hitch bar secured to the frame for facilitating transportation of the mixer apparatus by a tractor or the like.

In another feature of the present invention, the housing includes a base and a rim having a first and a second end. The first end of the rim is secured to the base. A floor is disposed between the auger and the final driven wheel, the floor being secured to the second end of the rim such that the base, the rim and the floor define therebetween an encasement for the final driven wheel. Furthermore, the floor defines an access hole for permitting removal and replacement therethrough of the final driven wheel. The floor includes a cover for covering the access hole. The cover defines an aperture through which the axis of rotation extends so that driving of the auger by the final driven wheel is permitted. Moreover, the cover includes a bearing which extends through the aperture. The bearing is disposed between the auger and the final driven wheel for bearingly supporting the auger and the final driven wheel for permitting rotation of the auger and final driven wheel when the final driven wheel is being driven.

In a preferred embodiment of the present invention, the floor defines an array of bores disposed around the access hole and the cover has a peripheral edge which defines a plurality of holes. A plurality of fasteners are arranged such that each fastener extends through a hole of the plurality of holes and an aligned bore of the array of bores for removably fastening the cover to the floor. The encasement is filled with lubricant for lubricating the final driven wheel. Also, the wall extends angularly away from the housing. Preferably, the wall defines a discharge outlet for the discharge therethrough of the feed. The discharge outlet includes a door that opens and at least one expeller for moving the feed away from the enclosure. Alternatively, the discharge outlet includes a door and a conveyor for conveying the feed away from the enclosure. In a further alternative arrangement, the outlet includes only a door.

In another feature of the present invention, the auger includes a core and flighting is connected to the core so that when the auger rotates, feed disposed within the enclosure is mixed. The core is of cylindrical configuration and the flighting is disposed helically around the core. More specifically, the flighting includes a first portion and a second portion staggered relative to the first portion such that movement of the feed between the first and second portions is interrupted. The first portion has a first and a second end, the first end being disposed adjacent to the housing. The second portion has a first and a second extremity, the first extremity being disposed in an adjacent spaced relationship relative to the second end of the first portion.

In another embodiment of the present invention, the first portion is a paddle and the second portion is a further paddle.

According to another feature of the present invention, the flighting has an inner edge and an outer edge, the inner edge being connected to the core. The outer edge is canted towards the housing such that discharging and cleaning of feed from the auger during an unloading operation is facilitated.

Also, the final driven wheel is a gear wheel and the gear wheel includes a plurality of straight teeth. In a preferred embodiment of the present invention, the gear wheel has a diameter of at least three foot.

In a further embodiment of the present invention, the final driven wheel is a driven sprocket wheel.

The mixer apparatus also includes a drive wheel having a further axis of rotation which is disposed spaced and approximately parallel to the axis of rotation of the auger, the drive wheel driving the final driven wheel.

In a preferred embodiment of the present invention, the drive wheel is a drive gear pinion having a plurality of teeth. Also, the final driven wheel is a gear wheel having gear teeth which intermesh with the plurality of teeth of the drive gear pinion so that when the drive gear pinion is rotated, the final driven wheel and auger are rotated. The floor is disposed between the auger and the final driven wheel, the floor being secured to the second end of the rim such that the base, the rim and the floor define therebetween the encasement for the final driven wheel. Also, the floor and base further define a cavity for the reception therein of the drive gear pinion. The mixer apparatus further includes a drive gear pinion bearing which is secured to the base for rotatably supporting the drive gear pinion within the cavity. A drive shaft is secured to the drive gear pinion, the drive shaft extending through the housing so that when the drive shaft is rotated, the drive gear pinion, the final driven wheel and the auger are rotated.

Alternatively, the drive gear pinion bearing is secured to the floor.

In a further feature of the present invention, the mixer apparatus includes a guide disposed in a vicinity of the plurality of teeth of the drive gear pinion and the gear teeth of the final driven wheel. The arrangement is such that when the plurality of teeth intermesh with the gear teeth of the final driven wheel, the intermeshing teeth are guided into an intermeshing relationship by the guide. The guide is secured to the drive gear pinion and is disposed between the drive gear pinion and the base.

Alternatively, the guide is disposed between the drive gear pinion and the floor.

In a further alternative arrangement, the guide is secured to the final driven wheel.

In another feature of the present invention, a further auger is disposed within the enclosure, the further auger having a rotational axis disposed approximately parallel and spaced from the axis of rotation of the auger. A drive wheel is common to the auger and the further auger, the drive wheel having a further axis of rotation which is disposed spaced and approximately parallel relative to the axis of rotation of the auger and the rotational axis of the further auger. The further axis of rotation of the drive wheel is disposed between the axis of rotation of the auger and the rotational axis of the further auger.

In another embodiment of the present invention, the axis of rotation of the auger is disposed between the further axis of rotation of the drive wheel and the rotational axis of the further auger. Additionally, the drive wheel is a drive gear pinion, the drive gear pinion having a plurality of teeth. The final driven wheel is a gear wheel having gear teeth which intermesh with the plurality of teeth of the drive gear pinion so that when the drive gear pinion is rotated, the final driven wheel and auger are rotated. The mixer apparatus further includes a further final driven wheel, the further final driven wheel being a further gear wheel having further gear teeth which are driven by the plurality of teeth of the final driven wheel. The arrangement is such that when the drive gear pinion is rotated, the final driven wheel and auger are rotated and the further final driven wheel and further auger are rotated.

In another feature of the present invention, the drive wheel is a first drive sprocket. The mixer apparatus further includes a second drive sprocket which is secured to the first drive sprocket and is disposed coaxially relative to the first drive sprocket. A drive extends around the first drive sprocket and the final driven wheel so that when the first drive sprocket is rotated, the drive rotates the final driven wheel. Also, a further final driven wheel is a further driven sprocket wheel. A further drive extends around the second drive sprocket and the further final driven wheel so that when the second drive sprocket is rotated, the further drive rotates the further final driven wheel. The drive is a first roller chain drive and the further drive is a second roller chain drive.

In yet another aspect of the present invention, the plurality of wheels includes a first wheel and a second wheel disposed spaced and coaxial relative to the first wheel. A first load cell is disposed between the first wheel and the frame and a second load cell is disposed between the second wheel and the frame. A hitch bar is connected to the frame and is disposed remote from the wheels. A third load cell has a first and a second end, the first end of the third load cell being secured to the hitch bar. A clevis is attached to the second end of the third load cell, the clevis being rotatable about a longitudinal axis of the third load cell. The arrangement is such that during a weighing operation which is dependent on measurements from the first, second and third load cells, the rotatable clevis adjusts to a difference in an inclination of the mixer apparatus and a tractor so that side pressures and inaccuracies in measurements from the third load cell is decreased.

In a first aspect of the present invention, a mixer apparatus for mixing livestock feed and the like, includes a container for the reception therein of the feed. The container includes a housing, a wall extending away from the housing, the wall defining an opening disposed remote from the housing for the reception therethrough of the feed. The arrangement is such that the housing and the wall define therebetween an enclosure for the feed received through the opening. An auger is disposed within the enclosure, the auger having an axis of rotation which extends through the housing.

The auger includes a core and flighting connected to the core so that when the auger rotates, feed disposed within the enclosure is mixed. The flighting includes a first portion and a second portion staggered relative to the first portion such that movement of the feed between the first and second portions is interrupted.

In a second aspect of the present invention, a mixer apparatus for mixing livestock feed and the like, includes a container for the reception therein of the feed. The container includes a housing, a wall extending away from the housing, the wall defining an opening disposed remote from the housing for the reception therethrough of the feed. The arrangement is such that the housing and the wall define therebetween an enclosure for the feed received through the opening. An auger is disposed within the enclosure, the auger having an axis of rotation which extends through the housing.

The auger includes a core and fighting connected to the core so that when the auger rotates, feed disposed within the enclosure is mixed. The flighting includes an inner edge and an outer edge. The inner edge is connected to the core and the outer edge is canted towards the housing such that discharging and cleaning of feed from the auger during an unloading operation is facilitated.

In a third aspect of the present invention, a mixer apparatus for mixing livestock feed and the like, includes a container for the reception therein of the feed. The container includes a housing, a wall extending away from the housing, the wall defining an opening disposed remote from the housing for the reception therethrough of the feed. The arrangement is such that the housing and the wall define therebetween an enclosure for the feed received through the opening. An auger is disposed within the enclosure, the auger having an axis of rotation which extends through the housing.

A final driven wheel is disposed within the housing, the final driven wheel being rotatable about the axis of rotation. The final driven wheel is drivingly connected to the auger so that when the final driven wheel is rotated within the housing, the auger is rotated therewith within the enclosure. The final driven wheel has a diameter of at least three foot.

In a fourth aspect of the present invention, a mixer apparatus for mixing livestock feed and the like, includes a container for the reception therein of the feed. The container includes a housing, a wall extending away from the housing, the wall defining an opening disposed remote from the housing for the reception therethrough of the feed. The arrangement is such that the housing and the wall define therebetween an enclosure for the feed received through the opening. An auger is disposed within the enclosure, the auger having an axis of rotation which extends through the housing.

A final driven wheel is disposed within the housing, the final driven wheel being rotatable about the axis of rotation, the final driven wheel being drivingly connected to the auger so that when the final driven wheel is rotated within the housing, the auger is rotated therewith within the enclosure. The final driven wheel is a gear wheel having a plurality of teeth. The mixer apparatus further includes a drive wheel having a further axis of rotation which is disposed spaced and approximately parallel to the axis of rotation of the auger, the drive wheel driving the final driven wheel. The drive wheel is a drive gear pinion having a further plurality of teeth. The teeth of the driven wheel intermesh with the further teeth of the drive gear pinion so that when the drive gear pinion is rotated, the final driven wheel and auger are rotated. A guide is disposed in a vicinity of the further teeth of the drive gear pinion and the teeth of the final driven wheel. The arrangement is such that when the teeth intermesh, the intermeshing teeth are guided into an intermeshing relationship by the guide.

In a fifth aspect of the present invention a mixer apparatus for mixing livestock feed and the like, includes a container for the reception therein of the feed. The container includes a housing, a wall extending away from the housing, the wall defining an opening disposed remote from the housing for the reception therethrough of the feed. The arrangement is such that the housing and the wall define therebetween an enclosure for the feed received through the opening. An auger is disposed within the enclosure, the auger having an axis of rotation which extends through the housing.

The mixer apparatus further includes a further auger which is disposed within the enclosure, the further auger having a rotational axis which is disposed approximately parallel and spaced from the axis of rotation of the auger. A drive wheel is common to the auger and the further auger, the drive wheel having a further axis of rotation which is disposed spaced and approximately parallel relative to the axis of rotation of the auger and the rotational axis of the further auger.

In a sixth aspect of the present invention a mixer apparatus for mixing livestock feed and the like, includes a container for the reception therein of the feed. The container includes a housing, a wall extending away from the housing, the wall defining an opening disposed remote from the housing for the reception therethrough of the feed. The arrangement is such that the housing and the wall define therebetween an enclosure for the feed received through the opening. An auger is disposed within the enclosure, the auger having an axis of rotation which extends through the housing.

The container further includes a frame for supporting thereon the housing and a plurality of wheels rotatably secured to the frame for permitting transportation of the mixer apparatus. A hitch bar is secured to the frame for facilitating transportation of the mixer apparatus by a tractor or the like. The plurality of wheels includes a first wheel and a second wheel disposed spaced and coaxial relative to the first wheel. A first load cell is disposed between the first wheel and the frame and a second load cell is disposed between the second wheel and the frame. The hitch bar is disposed remote from the wheels. A third load cell has a first and a second end, the first end of the third load cell being secured to the hitch bar. A clevis is attached to the second end of the third load cell, the clevis being rotatable about a longitudinal axis of the third load cell. The arrangement is such that during a weighing operation which is dependent on measurements from the first, second and third load cells, the rotatable clevis adjusts to a difference in an inclination of the mixer apparatus and a tractor so that side pressures and inaccuracies in measurements from the third load cell is decreased.

In a seventh aspect of the present invention, a mixer apparatus for mixing livestock feed and the like comprises a container for the reception therein of the feed. The container includes a housing and a wall extending away from the housing. The wall defines an opening disposed remote from the housing for the reception therethrough of the feed. The arrangement is such that the housing and the wall define therebetween an enclosure for the feed received through the opening. An auger is disposed within the enclosure, the auger having an axis of rotation which extends through the housing. A final driven wheel is disposed within the housing, the final driven wheel being rotatable about the axis of rotation. The final driven wheel is drivingly connected to the auger so that when the final driven wheel is rotated within the housing, the auger is rotated therewith within the enclosure for mixing the feed.

The housing includes a floor which is disposed between the auger and the final driven wheel, the floor being removable for permitting direct access to the final driven wheel.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various embodiments of the present invention.

DETAILED DESCRIPTION OF THE DRAWINGS

Figure 1:
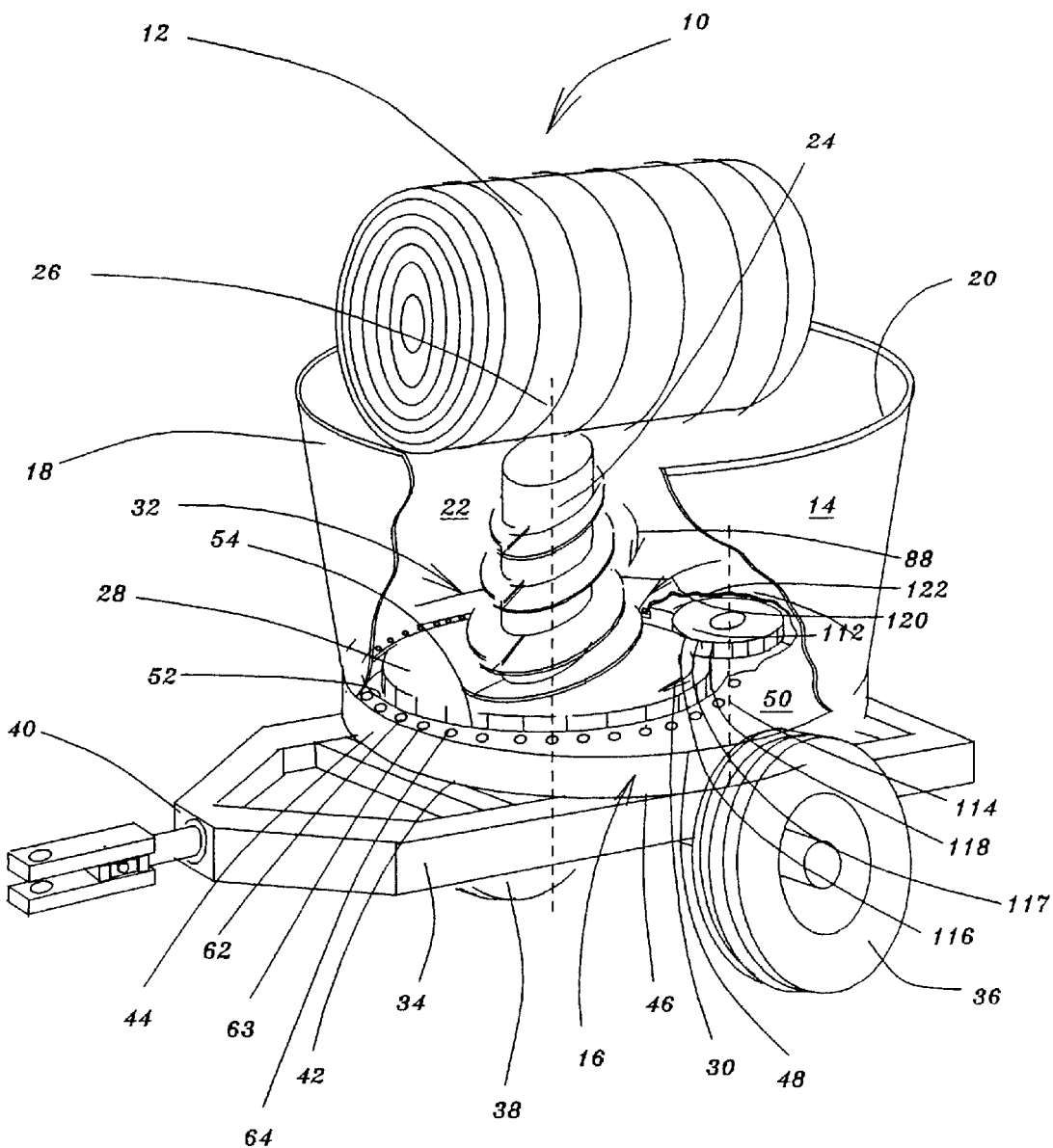
FIG. 1 is a perspective view of a mixer apparatus according to the present invention.

FIG. 1 is a perspective view of a mixer apparatus generally designated 10 for mixing livestock feed and the like 12. The apparatus 10 includes a container 14 for the reception therein of the feed 12. The container 14 includes a housing generally designated 16 and a wall 18 extending away from the housing 16. The wall 18 defines an opening 20 which is disposed remote from the housing 16 for the reception therethrough of the feed 12. The arrangement is such that the housing 16 and the wall 18 define therebetween an enclosure 22 for the feed 12 received through the opening 20. An auger 24 is disposed within the enclosure 22, the auger 24 having an axis of rotation 26 which extends through the housing 16. A final driven wheel 28 is disposed within the housing 16, the final driven wheel 28 being rotatable as indicated by the arrow 30, about the axis of rotation 26. The final driven wheel 28 is drivingly connected to the auger 24 so that when the final driven wheel 28 is rotated within the housing 16, the auger 24 is rotated therewith within the enclosure 22. The final driven wheel 28 and the auger 24 together as a unit generally designated 32 are removable and replaceable relative to the housing 16 and the enclosure 22 respectively. The arrangement is such that when the final driven wheel 28 and the auger 24 are together as the unit 32 removed, direct access to the final driven wheel 28 is permitted.

As shown in FIG. 1, the container 14 further includes a frame 34 for supporting the housing 16 thereon. The container 14 also includes a plurality of wheels 36 and 38 which are rotatably secured to the frame 34 for permitting transportation of the mixer apparatus 10. Additionally, the container 14 includes a hitch bar 40 which is secured to the frame 34 for facilitating transportation of the mixer apparatus 10 by a tractor or the like (not shown).

Also, as shown in FIG. 1, the housing 16 includes a base 42 and a rim 44 having a first and a second end 46 and 48 respectively. The first end 46 of the rim 44 is secured to the base 42. A floor 50 is disposed between the auger 24 and the final driven wheel 28, the floor 50 being secured to the second end 48 of the rim 44 such that the base 42, the rim 44 and the floor 50 define therebetween an encasement 52 for the final driven wheel 28. Furthermore, the floor 50 defines an access hole 54 for permitting removal and replacement therethrough of the final driven wheel 28. The floor 50 includes a cover 56 which has been removed for clarity in FIG. 1. The cover 56 is for covering the access hole 54.

Figure 2:
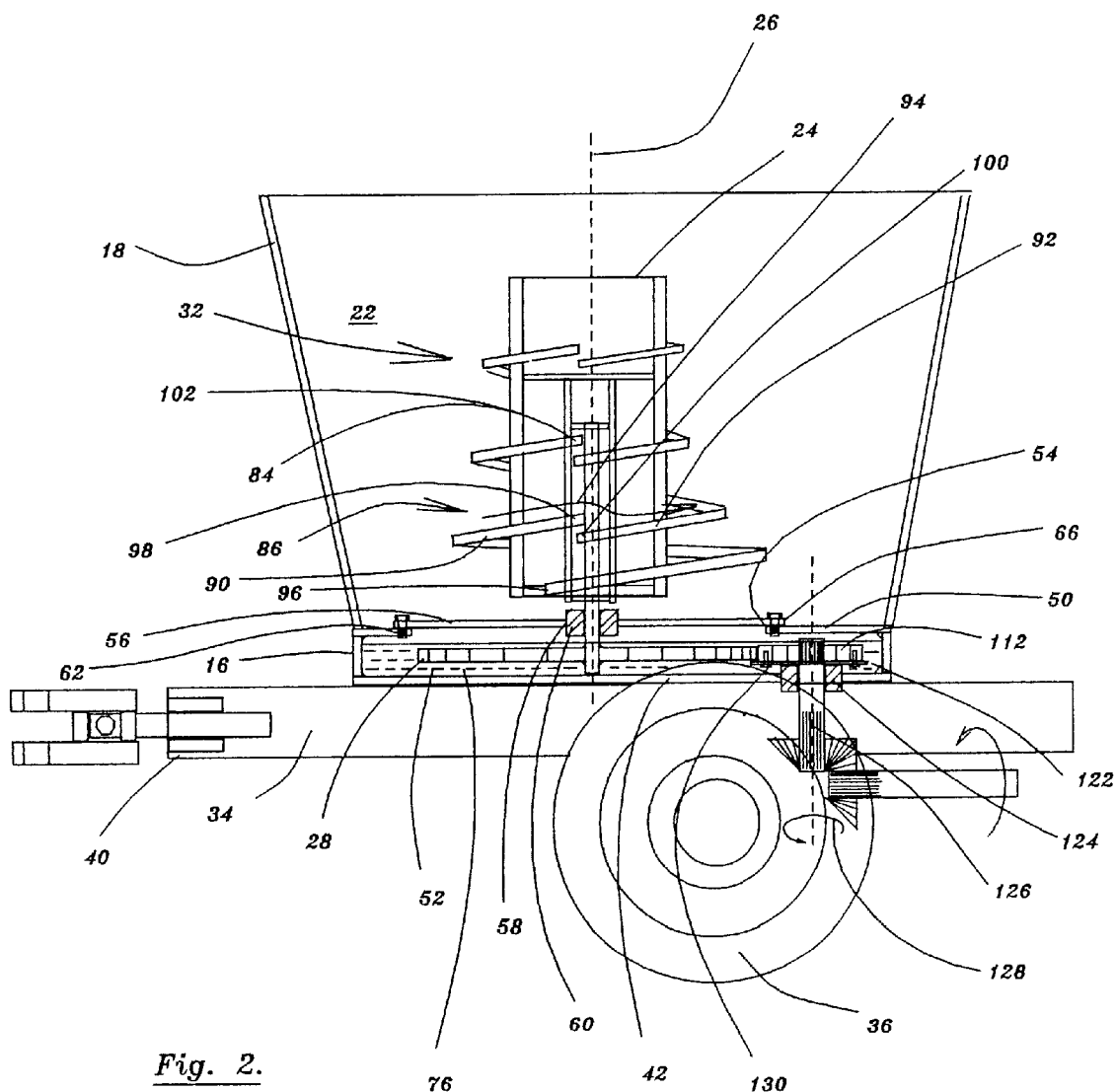
FIG. 2 is a side elevational view of the mixer apparatus shown in FIG. 1.

FIG. 2 is a side elevational view of the mixer apparatus shown in FIG. 1. As shown in FIG. 2, the cover 56 defines an aperture 58 through which the axis of rotation 26 extends so that driving of the auger 24 by the final driven wheel 28 is permitted. Moreover, the cover 56 includes a bearing 60 which extends through the aperture 58, the bearing 60 being disposed between the auger 24 and the final driven wheel 28 for bearingly supporting the auger 24 and the final driven wheel 28 for permitting rotation of the auger 24 and the final driven wheel 28 when the final driven wheel 28 is being driven.

As also shown in FIGS. 1 and 2, the floor 50 defines an array of bores 62, 63 and 64 disposed around the access hole 54.

Figure 3:
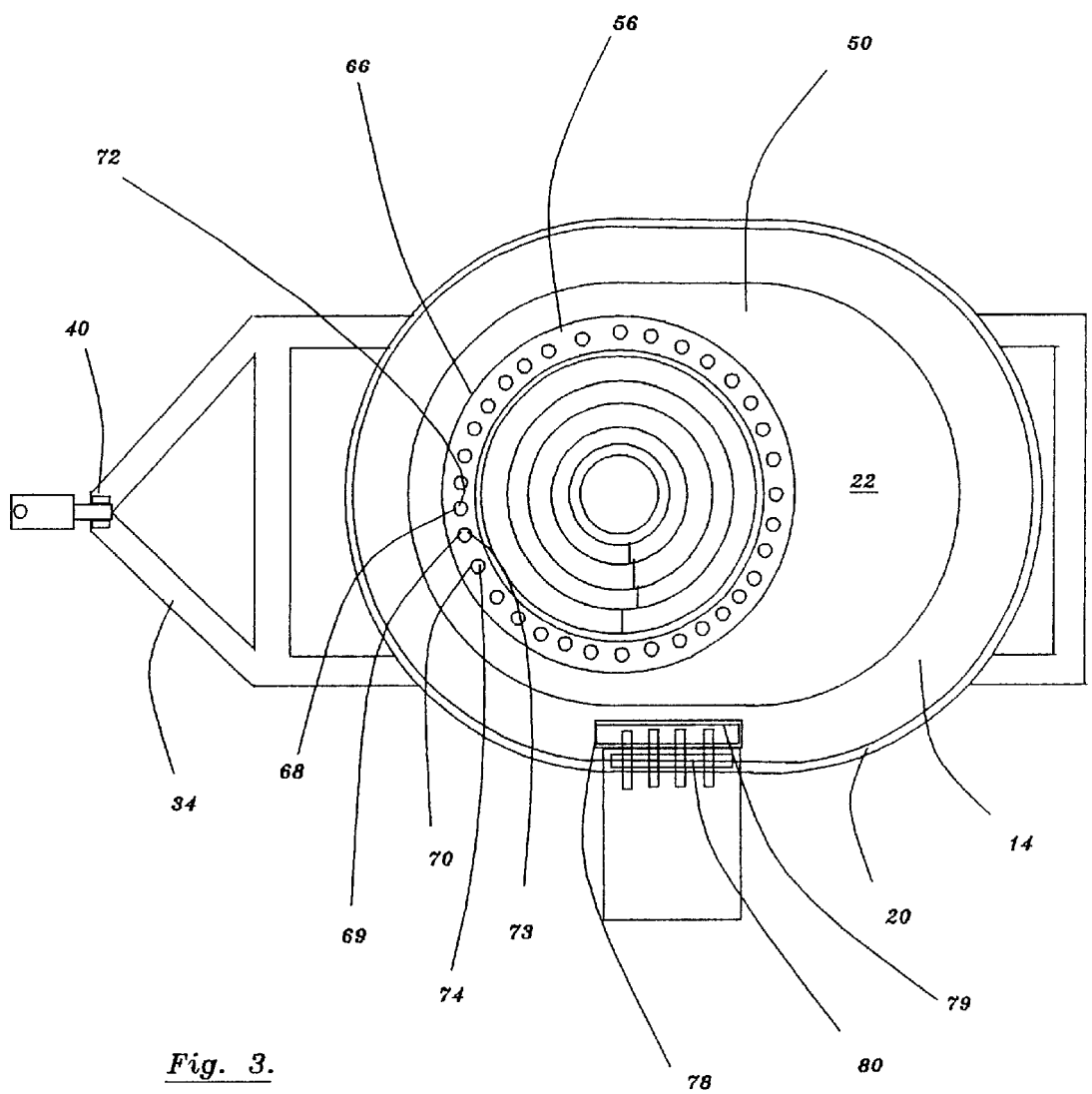
FIG. 3 is a top plan view of the mixer apparatus shown in FIG. 2.

FIG. 3 is a top plan view of the apparatus 10 shown in FIG. 2. As shown in FIG. 3, the cover 56 has a peripheral edge 66 which defines a plurality of holes 68, 69 and 70. A plurality of fasteners 72, 73 and 74 are arranged such that each fastener such as fastener 72 extends through a hole such as hole 68 of the plurality of holes 68–70 and an aligned bore such as bore 62 of the array of bores 62–64 shown in FIG. 1 for removably fastening the cover 56 to the floor 50. The encasement 52 is filled with lubricant 76 for lubricating the final driven wheel 28 as shown in FIG. 2.

Also, as shown in FIGS. 1–3, the wall 18 extends angularly away from the housing 16. Preferably, the wall 18 defines a discharge outlet 78 shown in FIG. 3 for the discharge therethrough of the feed 12. The discharge outlet 78 includes a door 79 and at least one rotary expeller 80 for moving the feed 12 away from the enclosure 22.

Figure 4:
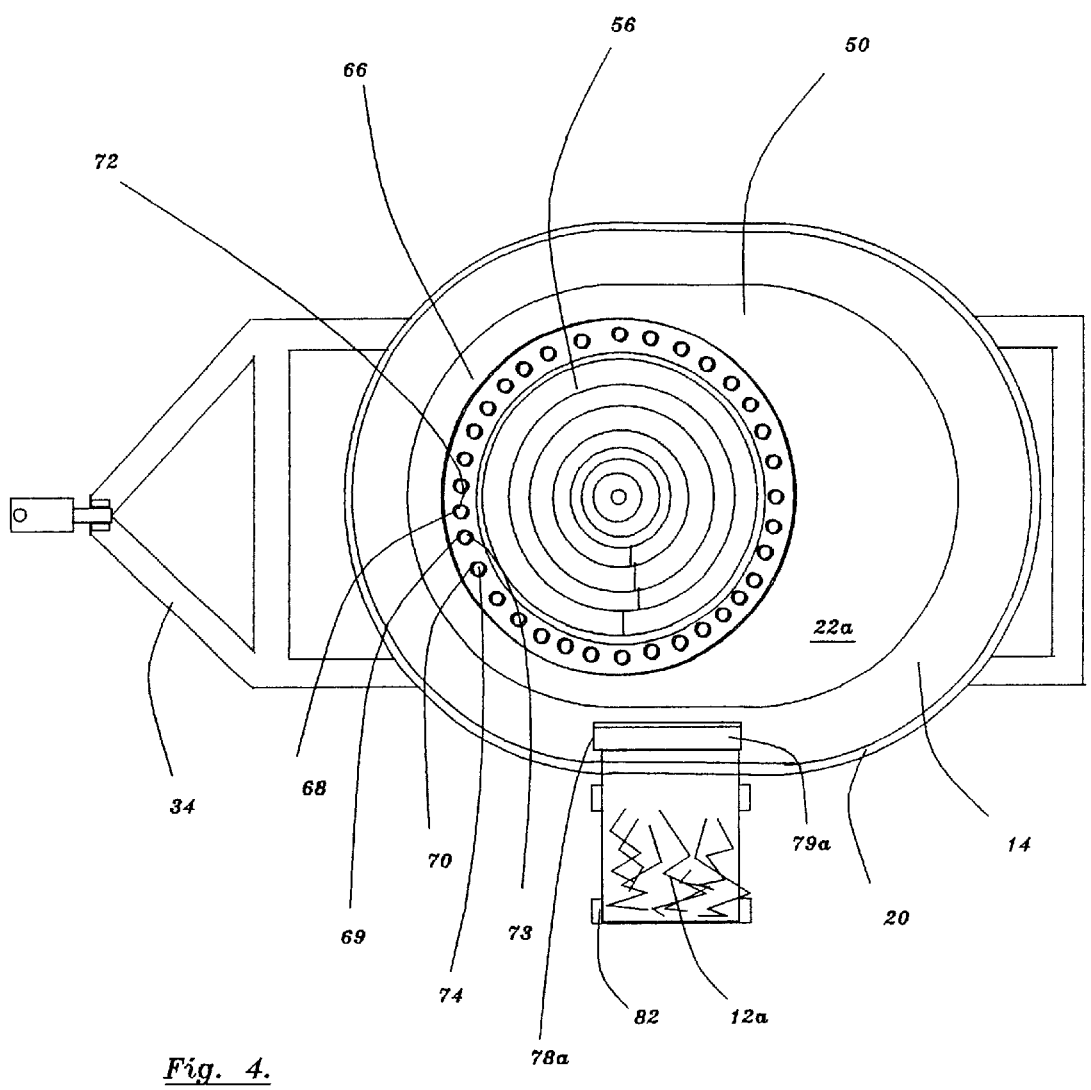
FIG. 4 is a top plan view of an alternative embodiment of the present invention.

FIG. 4 is a top plan view of an alternative embodiment of the present invention. As shown in FIG. 4, a discharge outlet 78a includes a conveyor 82 for conveying the feed 12a away from the enclosure 22a and a door 79a which is movable relative to the discharge outlet 78a.

In another feature of the present invention as shown in FIG. 2, the auger 24 includes a core 84 and flighting generally designated 86 is connected to the core 84 so that when the auger 24 rotates as indicated by the arrow 88 as shown in FIG. 1, feed 12 disposed within the enclosure 22 is mixed. The core 84 is of cylindrical configuration and the flighting 86 is disposed helically around the core 84. More specifically as shown in FIG. 2, the flighting 86 includes a first portion 90 and a second portion 92 which is staggered relative to the first portion 90 such that movement of the feed 12 as indicated by the arrow 94 between the first and second portions 90 and 92 respectively is interrupted. The first portion 90 has a first and a second end 96 and 98 respectively and is of spiral configuration. The first end 96 is disposed adjacent to the housing 16. The second portion 92 has a first and a second extremity 100 and 102 respectively, the first extremity 100 being disposed in an adjacent spaced relationship relative to the second end 98 of the first portion 90. The second portion 92 also is of spiral configuration. Those skilled in the art will appreciate that the core 84 could be of conical configuration or of square cross sectional configuration without departing from the spirit and concept of the present invention.

Figure 5:
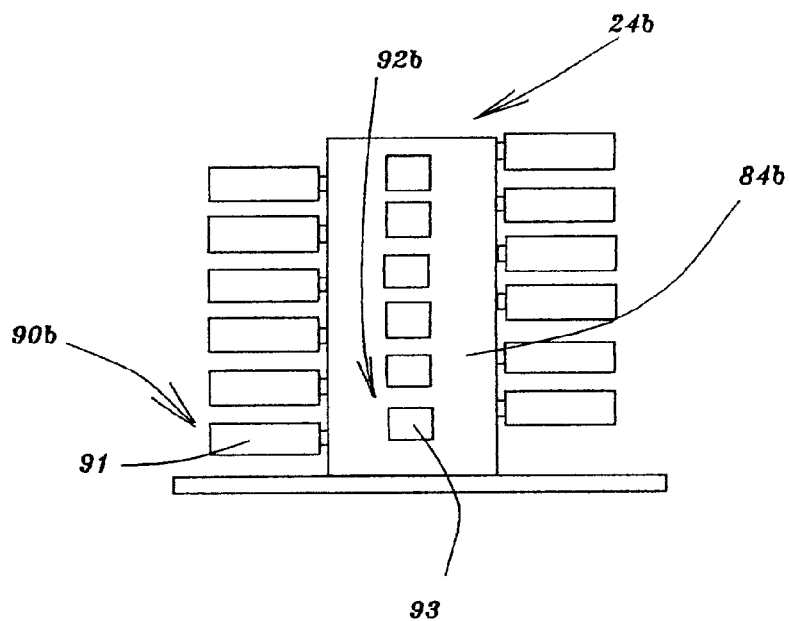
FIG. 5 is a side elevational view of another embodiment of the present invention.

FIG. 5 is a side elevational view of another embodiment of the present invention. As shown in FIG. 5, an auger 24b includes a first portion 90b which is a paddle 91 and a second portion 92b is a further paddle 93. The further paddle 93 is disposed in staggered relationship with paddle 91 as shown in FIG. 5. Also, as shown in FIG. 5, both of the paddles 91 and 93 extend from a core 84b of the auger 24b.

Figure 6:
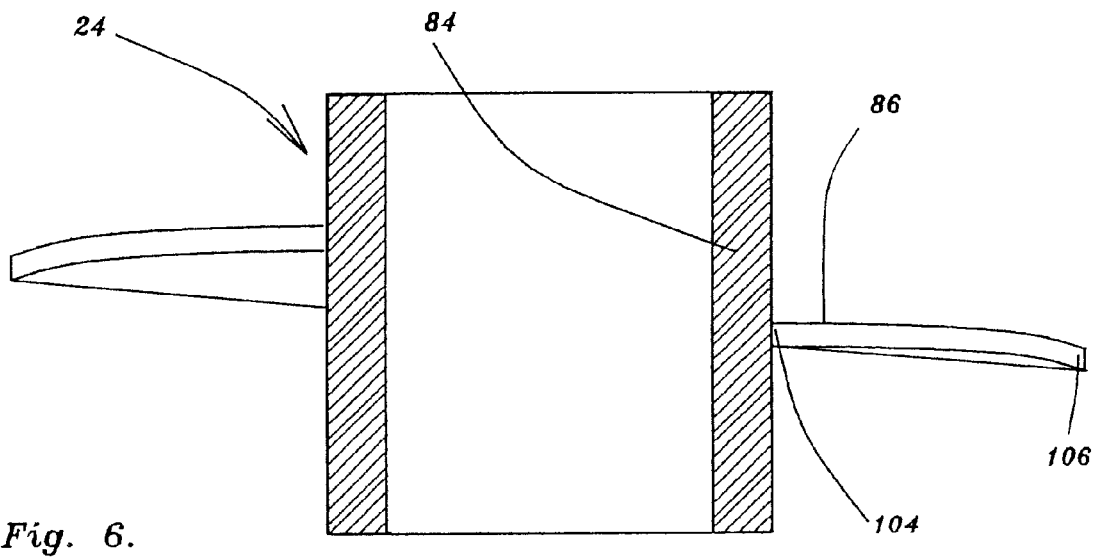
FIG. 6 is an enlarged side elevational view of the auger shown in FIG. 2.

FIG. 6 is an enlarged side elevational view of the auger 24 shown in FIG. 2. As shown in FIG. 6, the flighting 86 has an inner edge 104 and an outer edge 106, the inner edge 104 being connected to the core 84. The outer edge 106 is canted towards the housing 16 such that discharging and cleaning of feed 12 from the auger 24 during an unloading operation is facilitated.

Figure 7:
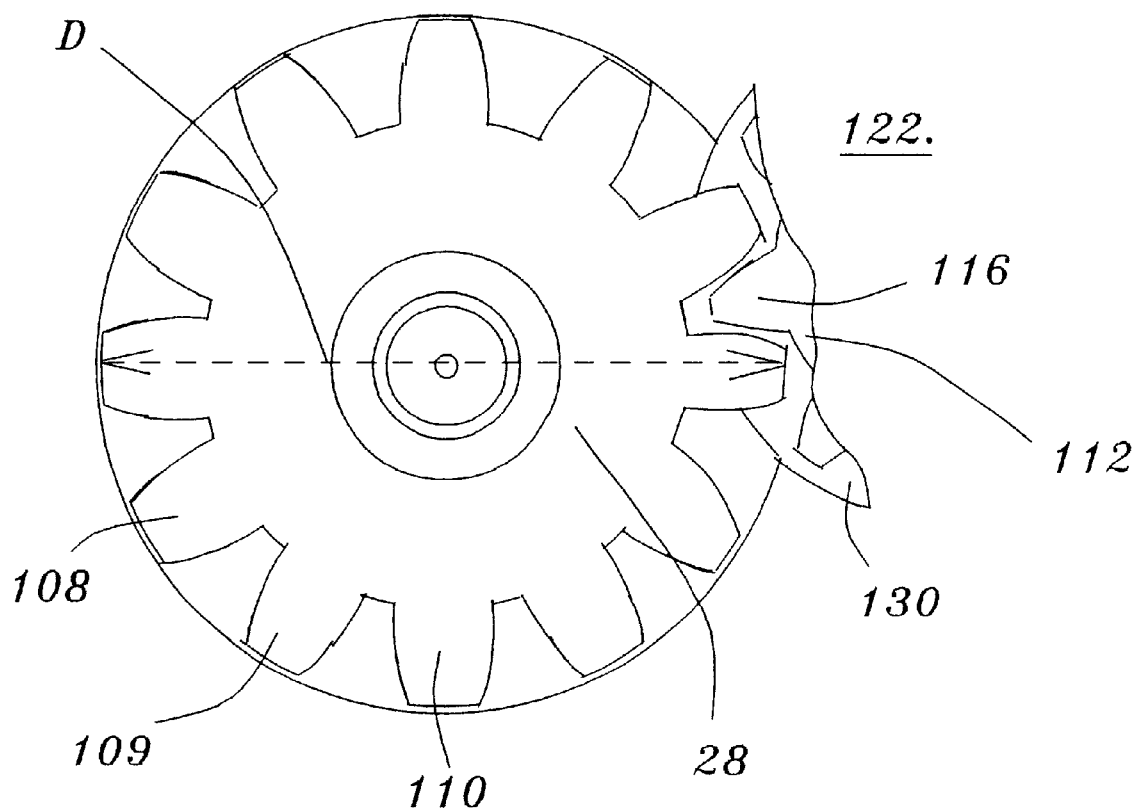
FIG. 7 is an enlarged view of the drive gear pinion and driven wheel shown in FIG. 1.

FIG. 7 is an enlarged top plan view of the final driven wheel 28 shown in FIG. 1. As shown in FIG. 7, the final driven wheel 28 is a gear wheel. The gear wheel 28 includes a plurality of straight teeth 108, 109 and 110. In a preferred embodiment of the present invention, the gear wheel 28 has a diameter D of at least three foot.

Figure 8:
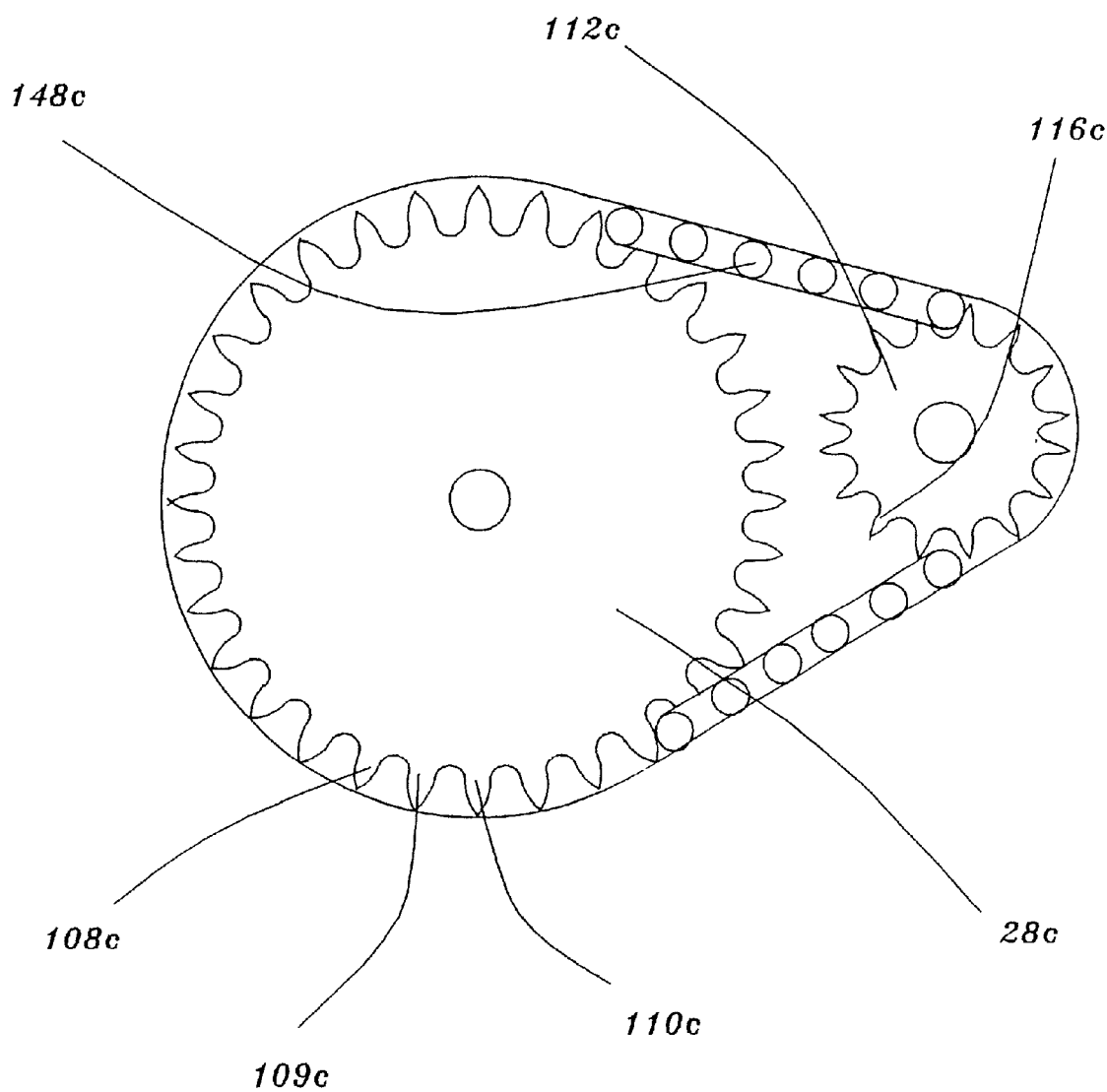
FIG. 8 is a top plan view similar to FIG. 7 of an alternative embodiment of the present invention.

FIG. 8 is a top plan view similar to FIG. 7 of an alternative embodiment of the present invention. As shown in FIG. 8, the final driven wheel 28c is a driven sprocket wheel with driven sprocket teeth 108c, 109c and 110c. Also, as shown in FIG. 8, a drive wheel 112c is a sprocket having teeth 116c for driving the driven wheel 28c by a drive chain 148c.

As shown in FIG. 1, the apparatus 10 also includes a drive wheel 112 having a further axis of rotation 114 which is disposed spaced and approximately parallel to the axis of rotation 26 of the auger 24, the drive wheel 112 driving the final driven wheel 28. More particularly, the drive wheel 112 is a drive gear pinion having a plurality of teeth 116, 117 and 118. The final driven wheel 28 is a gear wheel having gear teeth 108–110 as shown in FIG. 7 which intermesh with the plurality of teeth 116–118 of the drive gear pinion 112 so that when the drive gear pinion 112 is rotated as indicated by the arrow 120, the final driven wheel 28 and the auger 24 are rotated. The floor 50 is disposed between the auger 24 and the final driven wheel 28, the floor 50 being secured to the second end 48 of the rim 44 such that the base 42, the rim 44 and the floor 50 define therebetween the encasement 52 for the final driven wheel 28. Also, as shown in FIG. 2, the floor 50 and the base 42 further define a cavity 122 for the reception therein of the drive gear pinion 112. The mixer apparatus 10 further includes a drive gear pinion bearing 124 which is secured to the base 42 for rotatably supporting the drive gear pinion 112 within the cavity 122. A drive shaft 126 is secured to the drive gear pinion 112, the drive shaft 126 extending through the housing 16 so that when the drive shaft 126 is rotated as indicated by the arrow 128, the drive gear pinion 112, the final driven wheel 28 and the auger 24 are rotated.

FIG. 7 is an enlarged view of the drive gear pinion 112 and driven wheel 28. As shown in FIG. 7, the mixer apparatus 10 further includes a guide 130 disposed in a vicinity of the plurality of teeth 116–118 of the drive gear pinion 112 and the gear teeth 108–110 of the final driven wheel 28. The arrangement is such that when the plurality of teeth 116–118 intermesh with the gear teeth 108–110 of the final driven wheel 28, the intemeshing teeth 108–110 and 116–118 are guided by the guide 130 into an intermeshing relationship by the guide 130 as shown in FIG. 2. The guide 130 is secured to the drive gear pinion 112 and is disposed between the drive gear pinion 112 and the base 42 as shown in FIG. 2.

Figure 9:
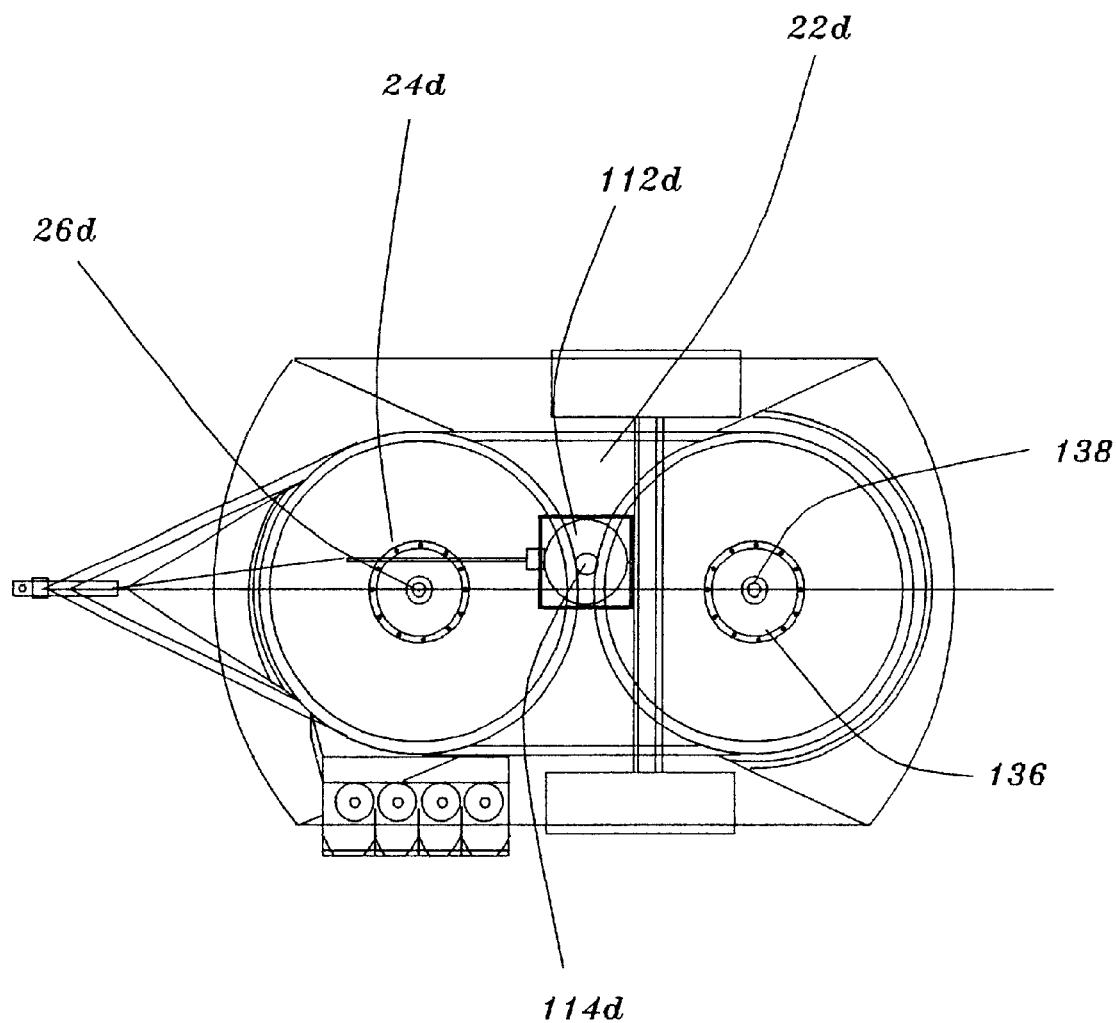
FIG. 9 is a top plan view of a further embodiment of the present invention.

FIG. 9 is a top plan view of a further embodiment of the present invention. As shown in FIG. 9, a further auger 136 is disposed within an enclosure 22d, the further auger 136 having a rotational axis 138 disposed approximately parallel and spaced from the axis of rotation 26d of an auger 24d.

FIG. 9 is a top plan view, partially in section, of a further feature of the present invention. As shown in FIG. 9, a drive wheel 112d is common to the auger 24d and the further auger 136. The drive wheel 112d, part of which is shown in FIG. 9, has a further axis of rotation 114d which is disposed spaced and approximately parallel relative to the axis of rotation 26d of the auger 24d and the rotational axis 138 of the further auger 136. The further axis of rotation 114d of the drive wheel 112d is disposed between the axis of rotation 26d of the auger 24d and the rotational axis 138 of the further auger 136.

Figure 10:
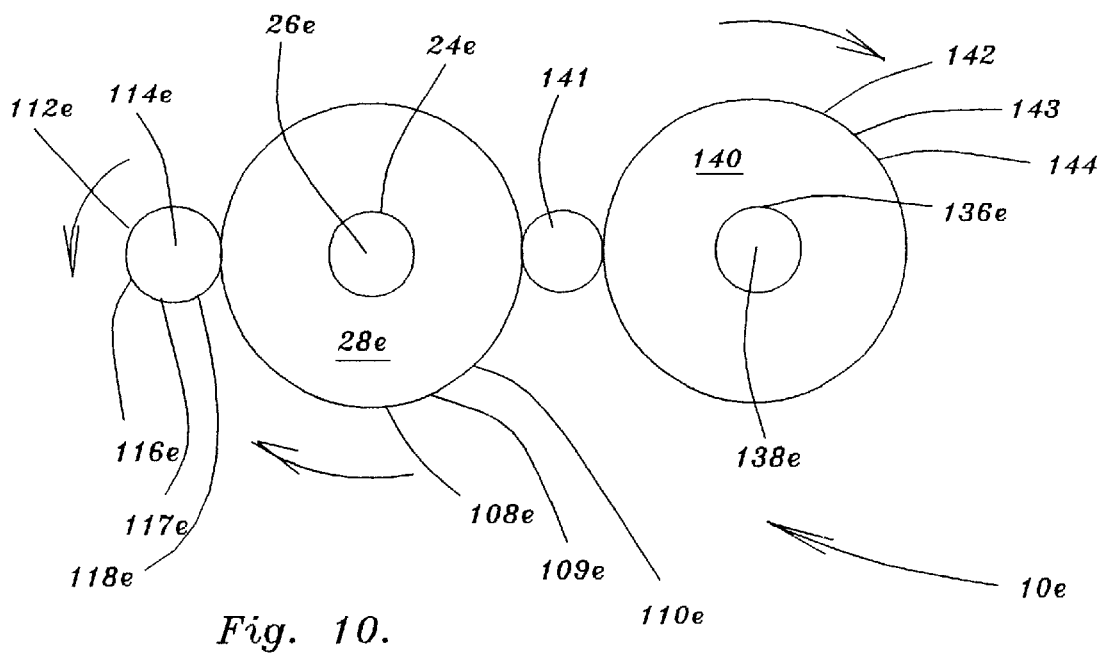
FIG. 10 is a diagrammatic representation viewed from the top of another embodiment of the present invention.

FIG. 10 is a diagrammatic representation viewed from the top of another embodiment of the present invention. As shown in FIG. 10, the axis of rotation 26e of the auger 24e and final driven wheel 28e is disposed between the further axis of rotation 114e of the drive wheel 112e and the rotational axis 138e of the further auger 136e. The drive wheel 112e is a drive gear pinion, the drive gear pinion having a plurality of teeth 116e–118e. The final driven wheel 28e is a gear wheel having gear teeth 108e–110e which intermesh with the plurality of teeth 116e–118e of the drive gear pinion 112e so that when the drive gear pinion 112e is rotated, the final driven wheel 28e and the auger 24e are rotated.

As shown in FIG. 10, the mixer apparatus 10e further includes a further final driven wheel 140, the further final driven wheel 140 being a further gear wheel having further gear teeth 142, 143 and 144 which are driven by the plurality of teeth 108e–110e of the driven wheel 28e. The arrangement is such that when the drive gear pinion 112e is rotated, the final driven wheel 28e and the auger 24e are rotated and the further final driven wheel 140 and further auger 136e are rotated. As shown in FIG. 10, a gear 141 is disposed between the wheels 28e and 140.

Figure 11:
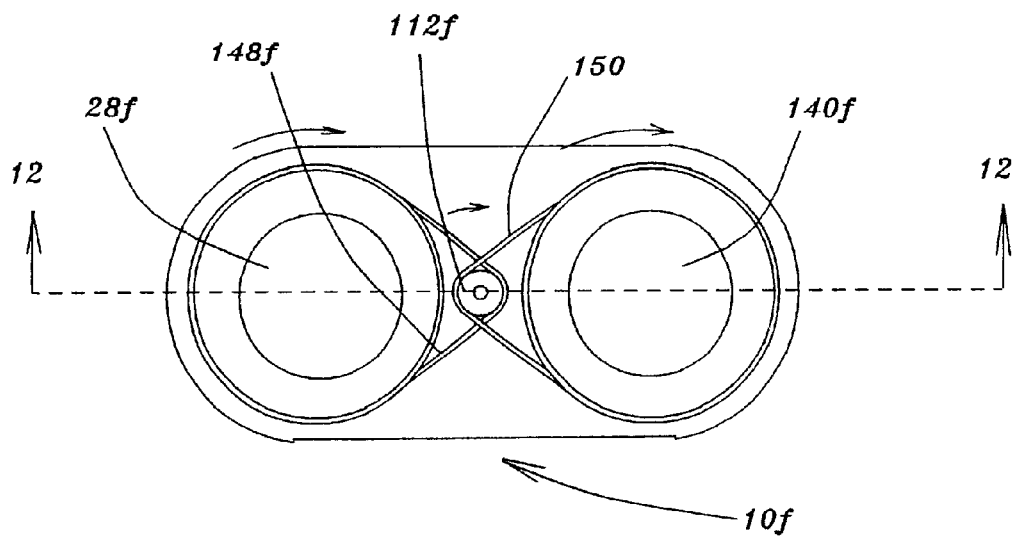
FIG. 11 is a top plan view of another embodiment of the present invention.

FIG. 11 is a top plan view of another embodiment of the present invention. As shown in FIG. 11, a drive wheel 112f is a first drive sprocket.

Figure 12:
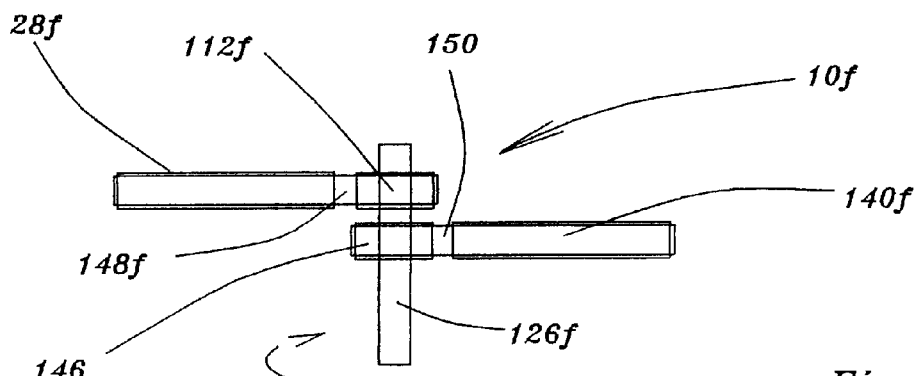
FIG. 12 is a sectional view taken on the line 12—12 of FIG. 11.

FIG. 12 is a sectional view taken on the line 12—12 of FIG. 11. As shown in FIG. 12, the mixer apparatus 10f further includes a second drive sprocket 146 which is secured to the first drive sprocket 112f and is disposed coaxially relative to the first drive sprocket 112f. A drive 148f extends around the first drive sprocket 112f and the final driven wheel 28f so that when the first drive sprocket 112f is rotated, the drive 148f rotates the final driven wheel 28f. Also, a further final driven wheel 140f is a further driven sprocket wheel. A further drive 150 extends around the second drive sprocket 146 and the further final driven wheel 140f so that when the second drive sprocket 146 is rotated, the further drive 150 rotates the further final driven wheel 140f. The drive 148f is a first roller chain drive and the further drive 150 is a second roller chain drive.

Figure 13:
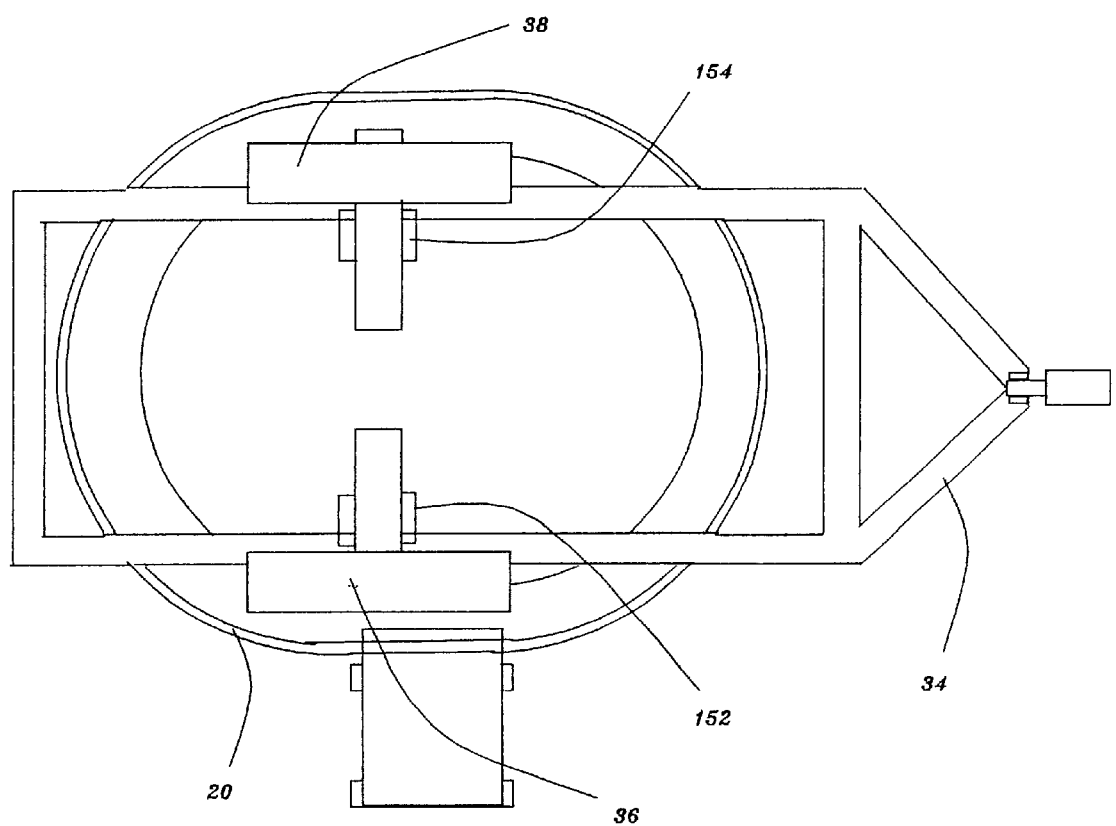
FIG. 13 is a view taken from beneath the mixer apparatus shown in FIG. 3.

FIG. 13 is a view taken from beneath the mixer apparatus 10 shown in FIG. 3. As shown in FIG. 13, the plurality of wheels 36 and 38 shown in FIG. 1 includes the first wheel 36 and the second wheel 38 disposed spaced and coaxial relative to the first wheel 36. A first load cell 152 is disposed between the first wheel 36 and the frame 34 and a second load cell 154 is disposed between the second wheel 38 and the frame 34 as shown in FIG. 13.

Figure 14:
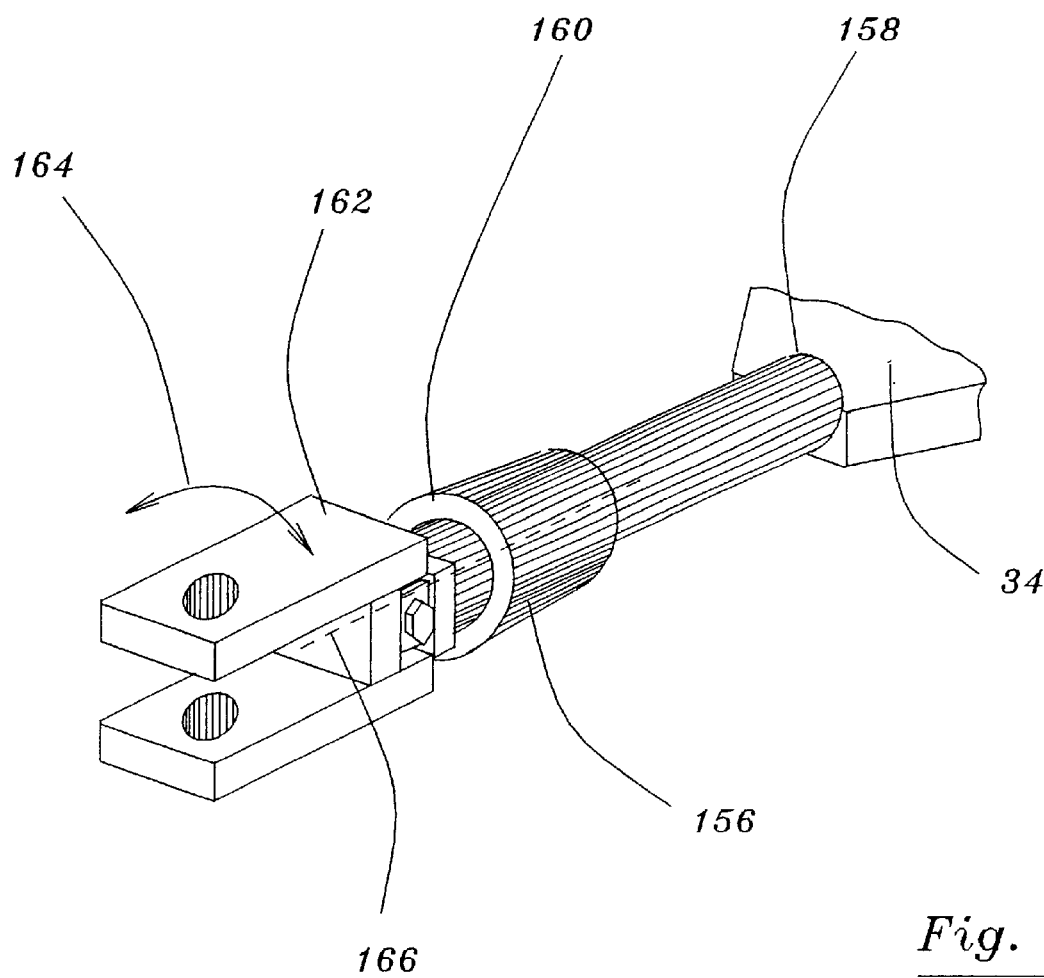
FIG. 14 is an enlarged perspective view of the hitch bar as shown in FIG. 1.

FIG. 14 is an enlarged perspective view of the hitch bar 40 as shown in FIG. 1. As shown in FIG. 14, the hitch bar 40 is connected to the frame 34 and is disposed remote from the wheels 36 and 38. A third load cell 156 has a first and a second end 158 and 160 respectively, the first end 158 of the third load cell 156 being secured to the hitch bar 40. A clevis 162 is attached to the second end 160 of the third load cell 156, the clevis 162 being rotatable as indicated by the arrow 164, about a longitudinal axis 166 of the third load cell 156. The arrangement is such that during a weighing operation which is dependent on measurements from the first, second and third load cells 152, 154 and 156, the rotatable clevis 162 adjusts to a difference in an inclination of the mixer apparatus 10 and a tractor (not shown) so that side pressures and inaccuracies in measurements from the third load cell 156 is decreased.

In operation of the mixer apparatus 10 according to the present invention as shown in FIG. 2, the cover 56 is unbolted from the floor 50 and the auger 24 and final driven wheel 28 are removed upwardly as a single unit so that immediate inspection and servicing of the final driven wheel 28 and drive wheel 112 is permitted. Also, reassembly of the unit 32 which includes the auger 24 and final driven wheel 28 is a simple operation in which the unit is lowered through the enclosure 22 followed by refastening the cover 56 to the floor 50.

The present invention provides a vertical auger mixer having a number of unique features which reduce the cost of production thereof and provide a mixer which permits easy access for inspecting and servicing the drive gears thereof.

What is claimed is:

1. A mixer apparatus for mixing livestock feed, said apparatus comprising:
    a container for the reception therein of the feed;
    said container including:
        a housing;
        a wall extending away from said housing, such that substantially all of said wall is disposed above said housing, said wall defining an opening disposed above and remote from said housing for the reception therethrough of the feed, the arrangement being such that said housing and said wall define therebetween an enclosure for the feed received through said opening;
        an auger disposed within said enclosure, said auger having an axis of rotation extending substantially vertically through said housing;
        a substantially horizontally disposed drive pinion;
        a final driven wheel driven by said drive pinion and disposed substantially horizontally within said housing, said pinion and final driven wheel intermeshing, said final driven wheel being rotatable about said axis of rotation, said final driven wheel being drivingly connected to said auger so that when said final driven wheel is rotated within said housing, said auger is rotated therewith within said enclosure for mixing the feed; and
        said final driven wheel and said auger together as a unit being removable in a first direction from said housing towards said opening and replaceable relative to said housing and enclosure respectively in a second direction from said opening towards said housing, said second direction being opposite to said first direction, the arrangement being such that when said final driven wheel and said auger are together as said unit removed, direct access to said final driven wheel is permitted.

2. A mixer apparatus as set forth in claim 1 wherein said container further includes:
    a frame for supporting said housing thereon.

3. A mixer apparatus as set forth in claim 2 wherein said container further includes:
    a plurality of wheels rotatably secured to said frame for permitting transportation of said mixer apparatus.

4. A mixer apparatus as set forth in claim 3 wherein said container further includes:
    a hitch bar secured to said frame for facilitating transportation of said mixer apparatus by a tractor.

5. A mixer apparatus as set forth in claim 3 wherein said plurality of wheels includes:
    a first wheel;
    a second wheel disposed spaced and coaxial relative to said first wheel;
    a first load cell disposed between said first wheel and said frame;
    a second load cell disposed between said second wheel and said frame;
    a hitch bar connected to said frame and disposed remote from said wheels;
    a third load cell having a first and a second end, said first end of said third load cell being secured to said hitch bar;
    a clevis attached to said second end of said third load cell, said clevis being rotatable about a longitudinal axis of said third load cell, the arrangement being such that during a weighing operation which is dependent on measurements from said first, second and third load cells, said rotatable clevis adjusts to a difference in an inclination of said mixer apparatus and a tractor so that side pressures and inaccuracies in measurements from said third load cell is decreased.

6. A mixer apparatus as set forth in claim 1 wherein said housing includes:

a base;

a rim having a first and a second end, said first end of said rim being secured to said base;

a floor disposed between said auger and said final driven wheel, said floor being secured to said second end of said rim such that said base, said rim and said floor define therebetween an encasement for said final driven wheel.

7. A mixer apparatus as set forth in claim 6 wherein said floor defines an access hole for permitting removal and replacement therethrough of said final driven wheel.

8. A mixer apparatus as set forth in claim 7 wherein said floor includes:

a cover for covering said access hole, said cover defining an aperture through which said axis of rotation extends so that driving of said auger by said final driven wheel is permitted.

9. A mixer apparatus as set forth in claim 8 wherein said cover includes:

a bearing extending through said aperture, said bearing being disposed between said auger and said final driven wheel for bearingly supporting said auger and said final driven wheel for permitting rotation of said auger and said final driven wheel when said final driven wheel is being driven.

10. A mixer apparatus as set forth in claim 8 wherein said floor defines an array of bores disposed around said access hole;

said cover having a peripheral edge which defines a plurality of holes;

a plurality of fasteners, each fastener extending through a hole of said plurality of holes and an aligned bore of said array of bores for removably fastening said cover to said floor.

11. A mixer apparatus as set forth in claim 6 wherein said encasement is filled with lubricant for lubricating said final driven wheel.

12. A mixer apparatus as set forth in claim 1 wherein said wall extends angularly away from said housing.

13. A mixer apparatus as set forth in claim 1 wherein said wall defines a discharge outlet for the discharge therethrough of the feed.

14. A mixer apparatus as set forth in claim 13 wherein said discharge outlet includes:

a door.

15. A mixer apparatus as set forth in claim 13 wherein said discharge outlet includes:

a door;

at least one expeller disposed adjacent to said door for moving the feed away from said enclosure.

16. A mixer apparatus as set forth in claim 13 wherein said discharge outlet includes:

a door;

a conveyor disposed adjacent to said door for conveying the feed away from said enclosure.

17. A mixer apparatus as set forth in claim 1 wherein said auger includes:

a core;

flighting connected to said core so that when said auger rotates, feed disposed within said enclosure is mixed.

18. A mixer apparatus as set forth in claim 17 wherein said core is of cylindrical configuration.

19. A mixer apparatus as set forth in claim 17 wherein said core is of conical configuration.

20. A mixer apparatus as set forth in claim 17 wherein said flighting is disposed helically around said core.

21. A mixer apparatus as set forth in claim 1 wherein said final driven wheel is a gear wheel.

22. A mixer apparatus as set forth in claim 21 wherein said gear wheel includes: a plurality of straight teeth.

23. A mixer apparatus as set forth in claim 21 wherein said gear wheel has a diameter of at least three foot.

24. A mixer apparatus as set forth in claim 1 wherein said drive pinion has a further axis of rotation which is disposed spaced and approximately parallel relative to said axis of rotation of said auger, said drive pinion driving said final driven wheel.

25. A mixer apparatus as set forth in claim 24 wherein said drive pinion is a drive gear pinion;

said drive gear pinion having a plurality of teeth;

said final driven wheel is a gear wheel having gear teeth which intermesh with said plurality of teeth of said drive gear pinion so that when said drive gear pinion is rotated, said final driven wheel and said auger are rotated.

26. A mixer apparatus as set forth in claim 24 wherein said drive pinion is a drive gear pinion;

said drive gear pinion having a plurality of teeth;

said final driven wheel is a gear wheel having gear teeth which intermesh with said plurality of teeth of said drive gear pinion so that when said drive gear pinion is rotated, said final driven wheel and auger are rotated;

said housing including:

a base;

a rim having a first and a second end, said first end of said rim being secured to said base;

a floor disposed between said auger and said final driven wheel, said floor being secured to said second end of said rim such that said base, said rim and said floor define therebetween an encasement for said final driven wheel;

said floor and said base further defining a cavity for the reception therein of said drive gear pinion.

27. A mixer apparatus as set forth in claim 26 further including:

a drive gear pinion bearing secured to said housing for rotatably supporting said drive gear pinion within said cavity;

a drive shaft secured to said drive gear pinion, said drive shaft extending through said housing so that when said drive shaft is rotated, said drive gear pinion, said final driven wheel and said auger are rotated.

28. A mixer apparatus as set forth in claim 25 further including:

a guide disposed in a vicinity of said plurality of teeth of said drive gear pinion and said gear teeth of said final driven wheel, the arrangement being such that when said plurality of teeth intermesh with said gear teeth of said final driven wheel, said intermeshing teeth are guided into an intermeshing relationship by said guide.

29. A mixer apparatus as set forth in claim 28 wherein said guide is secured to said drive gear pinion and is disposed between said drive gear pinion and said base.

30. A mixer apparatus as set forth in claim 1 further including:
 a further auger disposed within said enclosure, said further auger having a rotational axis disposed approximately parallel and spaced from said axis of rotation of said auger;
 said drive pinion being common to said auger and said further auger, said drive pinion having a further axis of rotation which is disposed spaced and approximately parallel relative to said axis of rotation of said auger and said rotational axis of said further auger.

31. A mixer apparatus as set forth in claim 30 wherein said further axis of rotation of said drive pinion is disposed between said axis of rotation of said auger and said rotational axis of said further auger.

32. A mixer apparatus as set forth in claim 30 wherein said axis of rotation of said auger is disposed between said further axis of rotation of said drive pinion and said rotational axis of said further auger.

33. A mixer apparatus as set forth in claim 30 wherein
 said drive pinion is a drive gear pinion;
 said drive gear pinion having a plurality of teeth;
 said final driven wheel being a gear wheel having gear teeth which intermesh with said plurality of teeth of said drive gear pinion so that when said drive gear pinion is rotated, said final driven wheel and auger are rotated;
 said mixer apparatus further including:
  a further final driven wheel, said further final driven wheel being a further gear wheel having further gear teeth which are driven by said final driven wheel so that when said drive gear pinion is rotated, said final driven wheel and auger are rotated and said further final driven wheel and further auger are rotated.

34. A mixer apparatus for mixing livestock feed, said apparatus comprising:
 a container for the reception therein of the feed;
 said container including:
  a housing;
  a wall extending away from said housing, such that substantially all of said wall is disposed above said housing, said wall defining an opening disposed above and remote from said housing for the reception therethrough of the feed, the arrangement being such that said housing and said wall define therebetween an enclosure for the feed received through said opening;
  an auger disposed within said enclosure, said auger having an axis of rotation extending substantially vertically through said housing;
  a substantially horizontally disposed drive wheel;
  a final driven wheel driven by said drive wheel and disposed substantially horizontally within said housing, said final driven wheel being rotatable about said axis of rotation, said final driven wheel being drivingly connected to said auger so that when said final driven wheel is rotated within said housing, said auger is rotated therewith within said enclosure for mixing the feed;
  said final driven wheel and said auger together as a unit being removable in a first direction from said housing towards said opening and replaceable relative to said housing and enclosure respectively in a second direction from said opening towards said housing, said second direction being opposite to said first direction, the arrangement being such that when said final driven wheel and said auger are together as said unit removed, direct access to said final driven wheel is permitted; and
  said final driven wheel being a driven sprocket wheel.

35. A mixer apparatus as set forth in claim 34 wherein said mixer apparatus further includes:
 a first drive sprocket;
 a second drive sprocket secured to said first drive sprocket and disposed coaxially relative to said first drive sprocket;
 a drive extending around said first drive sprocket and said final driven wheel so that when said first drive sprocket is rotated, said drive rotates said final driven wheel;
 a further final driven wheel, said further final driven wheel being a further driven sprocket wheel;
 a further drive extending around said second drive sprocket and said further final driven wheel so that when said second drive sprocket is rotated, said further drive rotates said further final driven wheel.

36. A mixer apparatus as set forth in claim 35 wherein said drive is a first roller chain drive;
 said further drive is a second roller chain drive.

37. A mixer apparatus for mixing livestock feed, said apparatus comprising:
 a container for the reception therein of the feed;
 said container including:
  a housing;
  a wall extending away from said housing, said wall defining an opening disposed above and remote from said housing for the reception therethrough of the feed, the arrangement being such that said housing and said wall define therebetween an enclosure for the feed received through said opening;
  an auger disposed within said enclosure and above said housing, said auger having an axis of rotation extending through said housing;
  a substantially horizontally disposed drive pinion;
  a final driven wheel driven by said drive pinion and disposed substantially horizontally within said housing, said pinion and final driven wheel intermeshing, said final driven wheel being rotatable about said axis of rotation, said final driven wheel being drivingly connected to said auger so that when said final driven wheel is rotated within said housing, said auger is rotated therewith within said enclosure for mixing the feed;
  said final driven wheel and said auger together as a unit being removable in a first direction from said housing towards said opening and replaceable relative to said housing and enclosure respectively in a second direction from said opening towards said housing, said second direction being opposite to said first direction, the arrangement being such that when said final driven wheel and said auger are together as said unit removed, direct access to said final driven wheel is permitted; and
  said final driven wheel having a diameter of at least three foot.

38. A mixer apparatus for mixing livestock feed, said apparatus comprising:
 a container for the reception therein of the feed;
 said container including:
  a housing;
  a wall extending away from said housing, said wall defining an opening disposed remote from said housing for the reception therethrough of the feed, the arrangement being such that said housing and said wall define therebetween an enclosure for the feed received through said opening;

an auger disposed within said enclosure and above said housing, said auger having an axis of rotation extending substantially vertically through said housing;

a substantially horizontally disposed final driven wheel disposed within said housing, said final driven wheel being rotatable about said axis of rotation, said final driven wheel being drivingly connected to said auger so that when said final driven wheel is rotated within said housing, said auger is rotated therewith within said enclosure for mixing the feed;

said final driven wheel being a gear wheel;

said gear wheel including:
a plurality of teeth;

said mixer apparatus further including:
a drive wheel having a further axis of rotation which is disposed spaced and approximately parallel to said axis of rotation of said auger, said drive wheel driving said final driven wheel;

said drive wheel being a substantially horizontally disposed drive gear pinion;

said drive gear pinion having a further plurality of teeth;

said teeth of said driven wheel intermeshing with said further teeth of said drive gear pinion so that when said drive gear pinion is rotated, said final driven wheel and auger are rotated; and a guide disposed coaxially relative to said drive gear pinion and disposed in a vicinity of said further teeth of said drive gear pinion and said teeth of said final driven wheel, the arrangement being such that when said teeth intermesh, said intermeshing teeth are guided into an intermeshing relationship by said guide.

39. A mixer apparatus for mixing livestock feed, said apparatus comprising:

a container for the reception therein of the feed;

said container including:
a housing;
a wall extending away from said housing, the arrangement being such that substantially all of said wall is disposed above said housing, said wall defining an opening disposed remote from said housing for the reception therethrough of the feed, the arrangement being such that said housing and said wall define therebetween an enclosure for the feed received through said opening;

an auger disposed within said enclosure, said auger having an axis of rotation extending substantially vertically through said housing;

said mixer apparatus further including:
a further auger disposed within said enclosure, said further auger having a rotational axis disposed approximately parallel and spaced from said axis of rotation of said auger;
a substantially horizontally disposed drive pinion;
a final driven wheel driven by said drive pinion and disposed substantially horizontally within said housing, said pinion and final driven wheel intermeshing, said final driven wheel being rotatable about said axis of rotation, said final driven wheel being drivingly connected to said auger so that when said final driven wheel is rotated within said housing, said auger is rotated therewith within said enclosure for mixing the feed; and said drive pinion being common to said auger and said further auger, said drive pinion having a further axis of rotation which is disposed spaced and approximately parallel relative to said axis of rotation of said auger and said rotational axis of said further auger.

40. A mixer apparatus for mixing livestock feed, said apparatus comprising:

a container for the reception therein of the feed;

said container including:
a housing;
a wall extending away from said housing, said wall defining an opening disposed remote from said housing for the reception therethrough of the feed, the arrangement being such that said housing and said wall define therebetween an enclosure for the feed received through said opening;

an auger disposed within said enclosure, said auger having an axis of rotation extending through said housing;

said container further including:
a frame for supporting thereon said housing;
a plurality of wheels rotatably secured to said frame for permitting transportation of said mixer apparatus;
a hitch bar secured to said frame for facilitating transportation of said mixer apparatus by a tractor;
said plurality of wheels including:
a first wheel;
a second wheel disposed spaced and coaxial relative to said first wheel;
a first load cell disposed between said first wheel and said frame;
a second load cell disposed between said second wheel and said frame;
said hitch bar being disposed remote from said wheels;
a third load cell having a first and a second end, said first end of said third load cell being secured to said hitch bar;
a clevis attached to said second end of said third load cell, said clevis being rotatable about a longitudinal axis of said third load cell, the arrangement being such that during a weighing operation which is dependent on measurements from said first, second and third load cells, said rotatable clevis adjusts to a difference in an inclination of said mixer apparatus and a tractor so that side pressures and inaccuracies in measurements from said third load cell is decreased;
a substantially horizontally disposed drive pinion; and
a final driven wheel driven by said drive pinion and disposed substantially horizontally within said housing, said pinion and final driven wheel intermeshing, said final driven wheel being rotatable about said axis of rotation, said final driven wheel being drivingly connected to said auger so that when said final driven wheel is rotated within said housing, said auger is rotated therewith within said enclosure for mixing the feed.

41. A mixer apparatus for mixing livestock feed, said apparatus comprising:

a container for the reception therein of the feed;

said container including:

a housing;

a wall extending away from said housing, said wall defining an opening disposed remote from said housing for the reception therethrough of the feed, the arrangement being such that said housing and said wall define therebetween an enclosure for the feed received through said opening;

an auger disposed within said enclosure, said auger having an axis of rotation extending through said housing;

a substantially horizontally disposed drive pinion;

a final driven wheel driven by said drive pinion and disposed substantially horizontally within said housing, said pinion and final driven wheel intermeshing, said final driven wheel being rotatable about said axis of rotation, said final driven wheel being drivingly connected to said auger so that when said final driven wheel is rotated within said housing, said auger is rotated therewith within said enclosure for mixing the feed; and said housing including:

a floor disposed between said auger and said final driven wheel, said floor being removable for permitting direct access to said final driven wheel, said floor being unfastened prior to removal of said auger such that removal of both said floor together with said auger as a unit is permitted.

* * * * *